United States Patent
Abe

(10) Patent No.: US 11,579,000 B2
(45) Date of Patent: Feb. 14, 2023

(54) MEASUREMENT OPERATION PARAMETER ADJUSTMENT APPARATUS, MACHINE LEARNING DEVICE, AND SYSTEM

(71) Applicant: FANUC Corporation, Yamanashi (JP)

(72) Inventor: Hiroshi Abe, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 986 days.

(21) Appl. No.: 16/374,753

(22) Filed: Apr. 4, 2019

(65) Prior Publication Data
US 2019/0310115 A1 Oct. 10, 2019

(30) Foreign Application Priority Data

Apr. 5, 2018 (JP) .............................. JP2018-073356
Jan. 8, 2019 (JP) .............................. JP2019-001207

(51) Int. Cl.
| | | |
|---|---|---|
| G01D 18/00 | (2006.01) | |
| G06N 20/00 | (2019.01) | |
| G06F 17/18 | (2006.01) | |
| G05B 13/02 | (2006.01) | |
| G05B 19/18 | (2006.01) | |

(52) U.S. Cl.
CPC .......... *G01D 18/00* (2013.01); *G05B 13/0265* (2013.01); *G05B 19/18* (2013.01); *G06F 17/18* (2013.01); *G06N 20/00* (2019.01)

(58) Field of Classification Search
CPC .... G01D 18/00; G05B 13/0265; G05B 19/18; G05B 13/027; G06F 17/18; G06N 20/00; G06N 3/08; B25J 9/1605; B25J 9/161; B25J 9/163; B25J 9/1661
See application file for complete search history.

(56) References Cited

U.S. PATENT DOCUMENTS

| | | |
|---|---|---|
| 2010/0241397 A1 | 9/2010 | Fischer |
| 2011/0276303 A1 | 11/2011 | Marshall et al. |
| 2016/0305777 A1 | 10/2016 | Racine et al. |
| 2017/0261395 A1 | 9/2017 | Lee |

(Continued)

FOREIGN PATENT DOCUMENTS

| | | |
|---|---|---|
| JP | H11201737 A | 7/1999 |
| JP | 201014504 A | 1/2010 |
| JP | 2010-217182 A | 9/2010 |

(Continued)

*Primary Examiner* — Tejal Gami
(74) *Attorney, Agent, or Firm* — Hauptman Ham, LLP

(57) ABSTRACT

A measurement operation parameter adjustment apparatus that enables efficient measurement of the placement position of an object to be measured even in the case where there are variations in the placement positions, the sizes, and the product types of objects to be measured includes a machine learning device. The machine learning device observes measurement operation parameter data representing the measurement operation parameter of the measurement operation and measurement time data representing time taken to perform the measurement operation as a state variable representing a current environmental state and performs learning or decision-making using a learning model obtained by modeling adjustment of the measurement operation parameter based on the state variable.

20 Claims, 10 Drawing Sheets

(56) References Cited

U.S. PATENT DOCUMENTS

2017/0262772 A1\* 9/2017 Takigawa ................. G06N 5/04
2018/0222046 A1\* 8/2018 Gotou ................... B25J 9/1612

FOREIGN PATENT DOCUMENTS

| JP | 2012515911 A | 7/2012 |
|---|---|---|
| JP | 2015195328 A | 11/2015 |
| JP | 201764910 A | 4/2017 |
| JP | 2017163782 A | 9/2017 |

\* cited by examiner

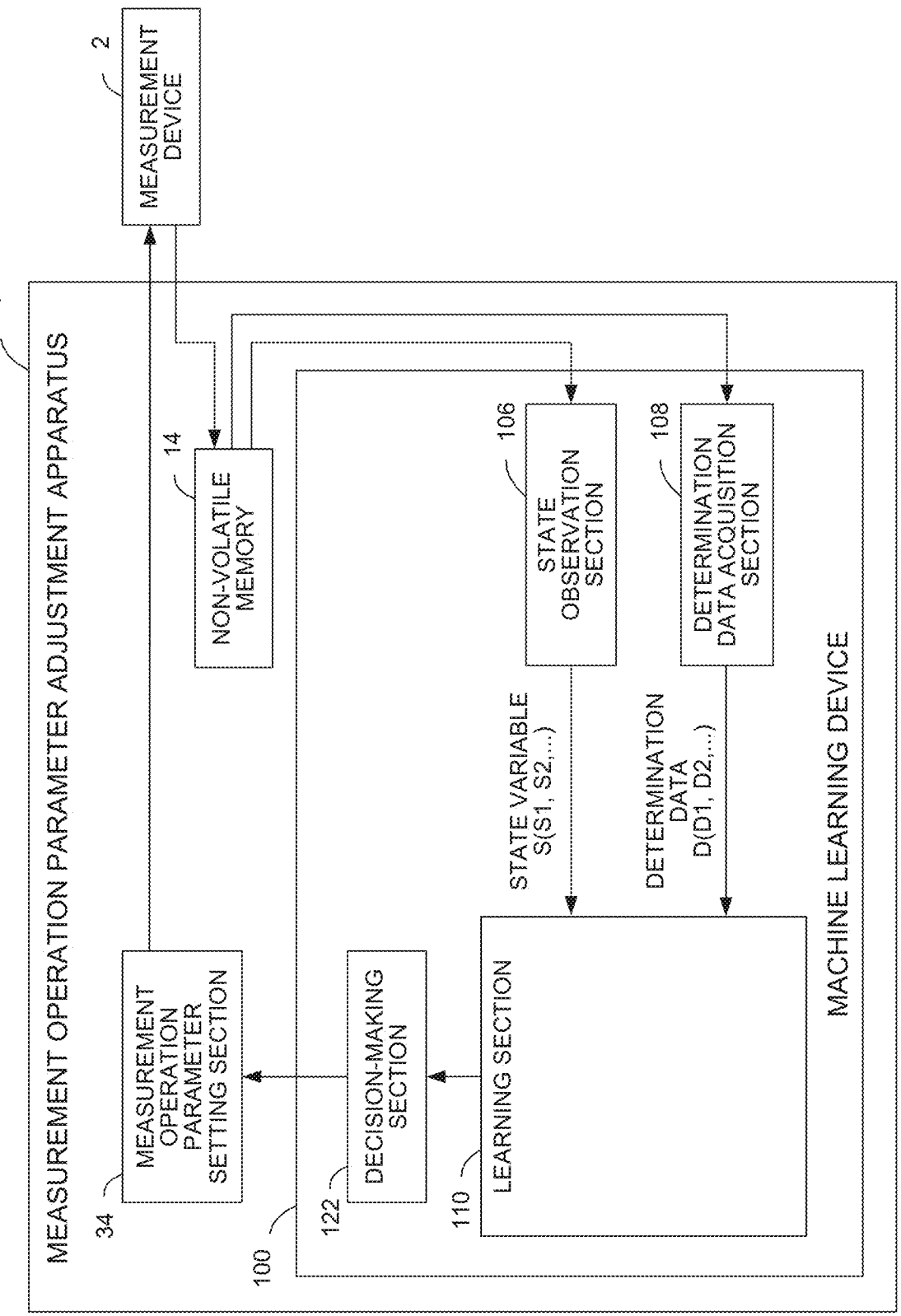

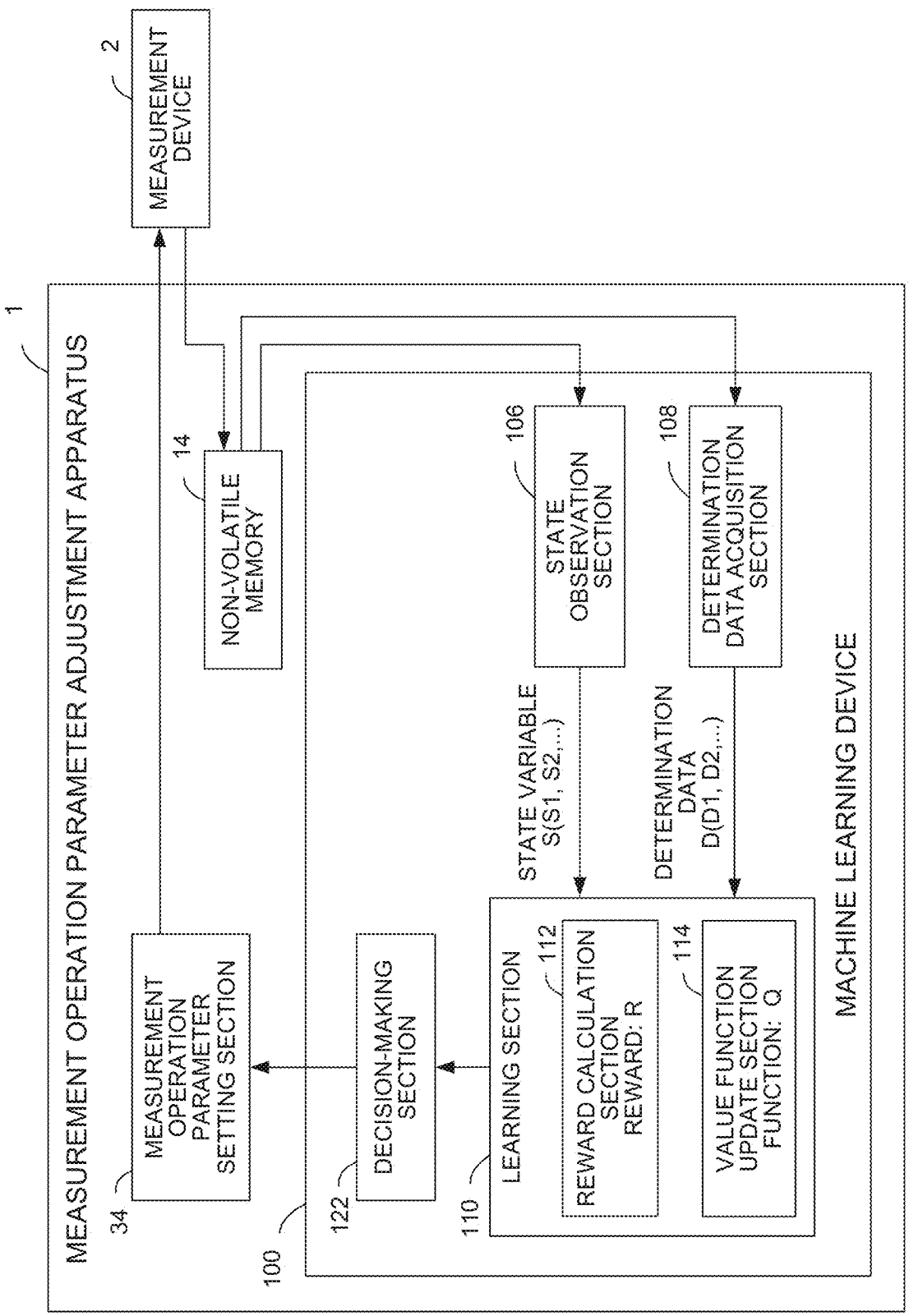

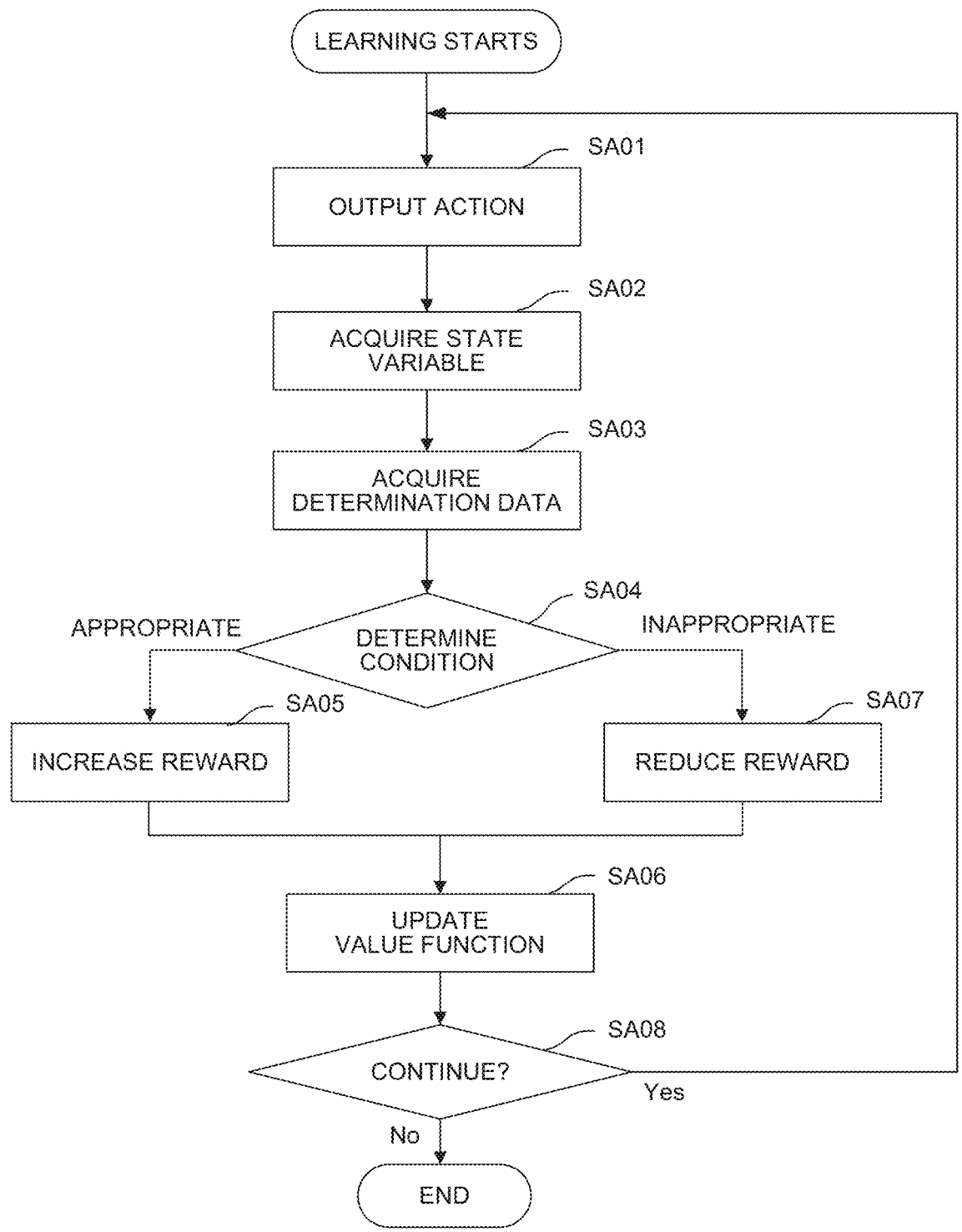

FIG. 11
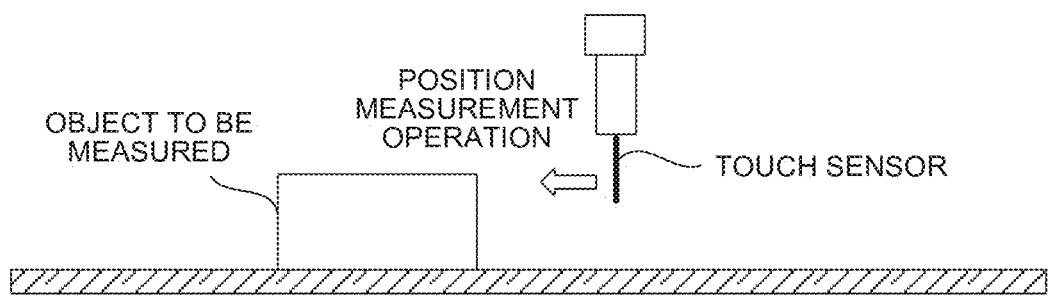
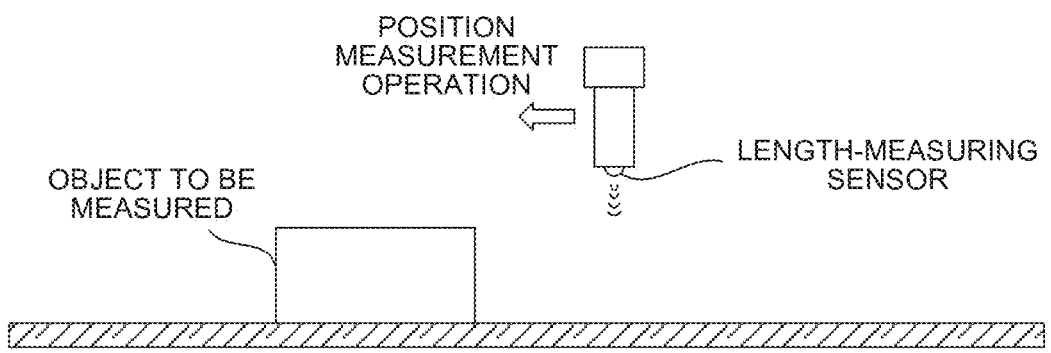

MEASUREMENT OPERATION PARAMETER ADJUSTMENT APPARATUS, MACHINE LEARNING DEVICE, AND SYSTEM

RELATED APPLICATION

The present application claims priority to Japanese Application Number 2018-073356 filed Apr. 5, 2018, and Japanese Application Number 2019-001207 filed Jan. 8, 2019. The disclosures of the above applications are hereby incorporated by reference in their entirety.

BACKGROUND OF THE INVENTION

1. Field of the Invention

The present invention relates to a measurement operation parameter adjustment apparatus, a machine learning device, and a system.

2. Description of the Related Art

As illustrated in FIG. 11, a sensor such as a contact touch sensor or a non-contact visual sensor, attached to a mechanical working portion, has been conventionally used to measure the position of an object to be measured by moving the working portion and thus moving the sensor. In an example illustrated in FIG. 11 in which a contact sensor is used, the position of an object to be measured can be measured based on a coordinate value of a working portion at the time when it is detected that the contact sensor comes in contact with a workpiece. In an example illustrated in FIG. 11 in which a non-contact sensor is used, the position of an object to be measured can be measured based on a coordinate value of a working portion at the time when the distance between the non-contact sensor and an object facing the non-contact sensor changes, that is, the time when the non-contact sensor reaches an end portion of the object to be measured.

To detect the position of an object to be measured with a sensor attached to a mechanical working portion, the position of the working portion at the start of the measurement operation and the travel speed of the working portion during the measurement operation need to be determined in advance. An example of a prior art technique for determining such position and speed is disclosed in Japanese Patent Application Laid-Open No. 2010-217182. In this prior art technique, a sensor is brought into contact with an object to be measured before measurement and, based on the position of the object to be measured at that time, the position of the working portion and the like at the start of the measurement operation are determined.

The technique disclosed in Japanese Patent Application Laid-Open No. 2010-217182 will be useful if the size and the placement position of an object to be measured do not vary. In actual cases, the position where a contact sensor touches an object to be measured and the position where a non-contact sensor detects a change in distance vary between objects to be measured of even the same product type. For example, in the case of measurement of the position of an object to be measured that has a hole in a bottom portion thereof and that is placed on a stage with the hole fitted to a protrusion provided on the stage, the object to be measured is ideally supposed to be consistently placed at the same position. Actually, play is provided between the hole and the protrusion, and the placement position of the object to be measured slightly varies. In some cases, even the shapes of objects to be measured vary, or the positions of objects to be measured of different product types are measured with the same measurement mechanics. To cope with such circumstances, the technique disclosed in Japanese Patent Application Laid-Open No. 2010-217182 has to prepare for the largest variation by uniformly setting a measurement operation start position with a margin, and it is difficult to reduce the takt time in accordance with the circumstances.

Moreover, the amount of time from when a contact sensor comes in contact with an object to be measured to when a digital signal is detected or the amount of time from when a non-contact sensor reaches an end portion of an object to be measured to when a digital signal is detected vary even among sensors of the same type due to individual differences. As long as such variation is not taken into consideration when the travel speed of a sensor is set, a collision between a (contact) sensor and an object to be measured may damage the sensor, the working portion, or the object to be measured, or may move the placement position of the object to be measured. Further, if the travel speed of the sensor during the measurement operation varies, the measured position of an object to be measured varies. Accordingly, the travel speed of the sensor during the measurement operation must be set to a fixed low speed from a holistic perspective. However, this causes another problem in that the takt time increases.

SUMMARY OF THE INVENTION

Accordingly, a measurement operation parameter adjustment apparatus, a machine learning device, and a system are desired which enable efficient measurement of the placement position of an object to be measured even in the case where there are variations in the placement positions, the sizes, and the product types of objects to be measured.

One aspect of the present invention is a measurement operation parameter adjustment apparatus for adjusting a measurement operation parameter of a measurement operation that is executed by a measurement device for measuring a placement position of an object to be measured. The measurement operation parameter adjustment apparatus includes a machine learning device for observing measurement operation parameter data representing the measurement operation parameter of the measurement operation and measurement time data representing time taken to perform the measurement operation as a state variable representing a current environmental state and performing learning or decision-making using a learning model obtained by modeling adjustment of the measurement operation parameter based on the state variable.

Another aspect of the present invention is a machine learning device for observing measurement operation parameter data representing a measurement operation parameter of a measurement operation that is executed by a measurement device for measuring a placement position of an object to be measured and measurement time data representing time taken to perform the measurement operation as a state variable representing a current environmental state, and performing learning or decision-making using a learning model obtained by modeling adjustment of the measurement operation parameter based on the state variable.

Still another aspect of the present invention is a system including a plurality of apparatuses connected to each other through a network. The plurality of apparatuses include at least a first measurement operation parameter adjustment apparatus described in the first aspect.

Yet another aspect of the present invention is a method regarding machine learning of adjustment of a measurement operation parameter of a measurement operation that is executed by a measurement device for measuring a placement position of an object to be measured. The method includes a step of performing a process regarding the machine learning of the adjustment of the measurement operation parameter using a learning model obtained by modeling the adjustment of the measurement operation parameter based on measurement operation parameter data representing the measurement operation parameter of the measurement operation and measurement time data representing time taken to perform the measurement operation, the measurement operation parameter data and the measurement time data being observed as a state variable representing a current environmental state.

According to the present invention, even in the case where there are variations in the placement positions, the sizes, and the product types of objects to be measured, the placement position of an object to be measured can be efficiently measured by causing a machine learning device to learn the variations.

BRIEF DESCRIPTION OF THE DRAWINGS

These and other objects and features of the present invention will become apparent from the following description of exemplary embodiments with reference to the accompanying drawings in which:

FIG. 2 is a functional block diagram schematically illustrating the measurement operation parameter adjustment apparatus according to the embodiment;

FIG. 3 is a functional block diagram schematically illustrating one aspect of the measurement operation parameter adjustment apparatus;

FIG. 4 is a flowchart schematically illustrating one aspect of a machine learning method;

FIG. 11 is a diagram for explaining a measurement operation of a measurement device for measuring the placement position of an object to be measured.

DETAILED DESCRIPTION OF THE PREFERRED EMBODIMENTS

Hereinafter, embodiments of the present invention will be described with reference to the drawings.

Figure 1:
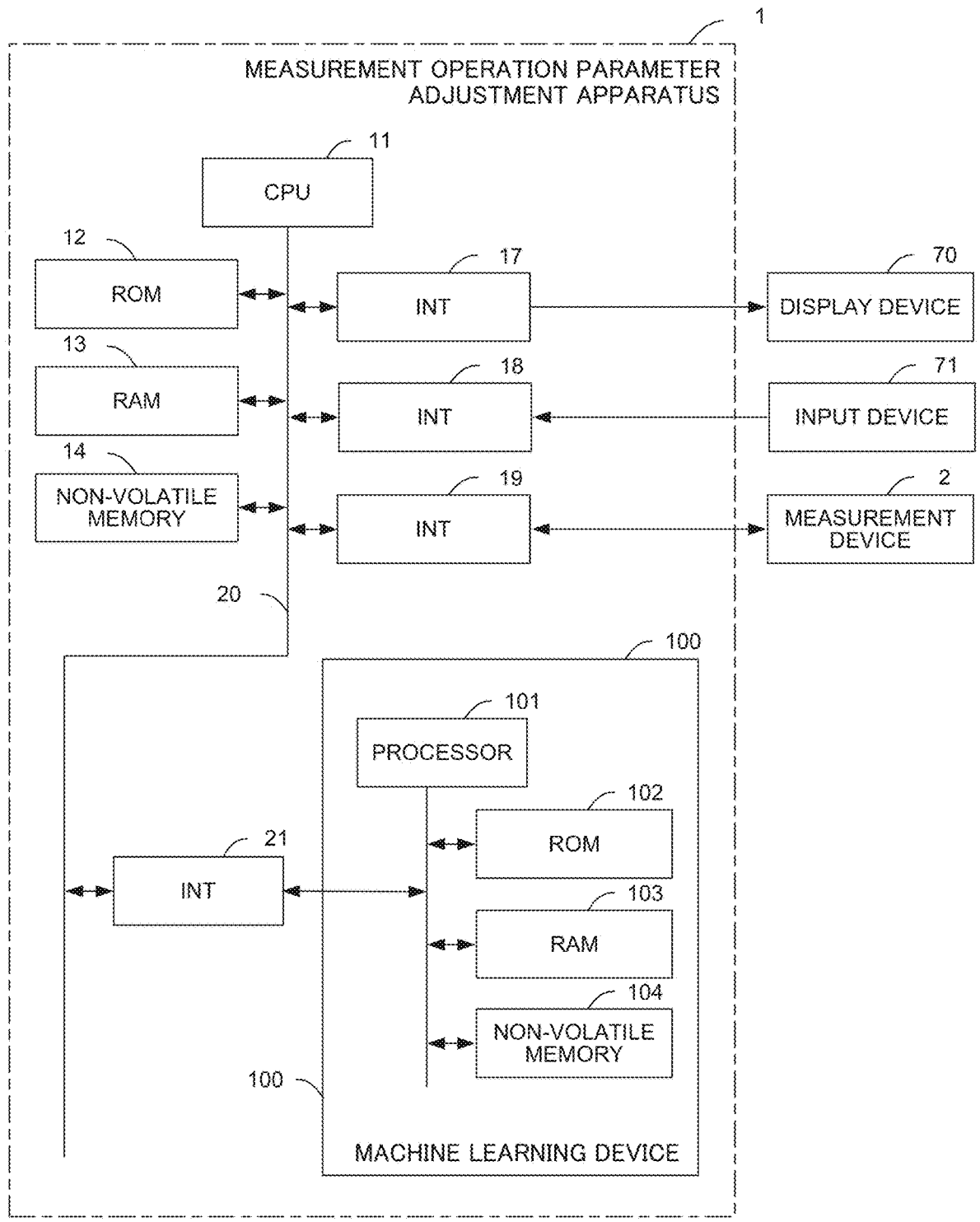
FIG. 1 is a hardware configuration diagram schematically illustrating a measurement operation parameter adjustment apparatus according to one embodiment.

FIG. 1 is a hardware configuration diagram schematically illustrating principal portions of a measurement operation parameter adjustment apparatus according to one embodiment. A measurement operation parameter adjustment apparatus 1 can be implemented as, for example, a control device for controlling a manufacturing machine or the like such as a robot, or a personal computer attached to a manufacturing machine or the like. Alternatively, the measurement operation parameter adjustment apparatus 1 can be implemented as a computer, such as a cell computer, an edge computer, a fog computer, a host computer, or a cloud server, that is connected to a manufacturing machine or the like through a wired/wireless network. The present embodiment is an example in which the measurement operation parameter adjustment apparatus 1 is implemented as a personal computer attached to a manufacturing machine or the like.

A CPU 11 included in the measurement operation parameter adjustment apparatus 1 according to the present embodiment is a processor for entirely controlling the measurement operation parameter adjustment apparatus 1. The CPU 11 reads out a system program stored in a ROM 12 via a bus 20 and controls the whole of the measurement operation parameter adjustment apparatus 1 in accordance with the system program. A RAM 13 temporarily stores data such as temporary calculation data, display data that are shown on a display device 70 such as a display, and various kinds of data inputted by an operator through an input device 71 such as a keyboard, a mouse, a touch panel, or the like.

A non-volatile memory 14 is backed up by a battery, which is not shown, for example, and thus, the non-volatile memory 14 is configured as a memory whose storage state is maintained even when the measurement operation parameter adjustment apparatus 1 is turned off. The non-volatile memory 14 stores programs inputted through the input device 71 and various kinds of data acquired from various sections of the measurement operation parameter adjustment apparatus 1 and a measurement device 2, residing on a robot or the like, that includes a sensor (for example, the position of the measurement device 2 in a coordinate system in which the measurement device 2 performs measurement, the position of a sensor of the measurement device 2 at the start of a measurement operation, the travel speed of the sensor of the measurement device 2 during the measurement operation, the amount of time from when a measurement operation has been started to when the sensor has detected an object to be measured during the measurement operation, the product type of the object to be measured, information on the states of the sensor and the object to be measured which has been inputted by an operator, and the like). Such programs and various kinds of data stored in the non-volatile memory 14 may be loaded into the RAM 13 at the time of execution or use. The ROM 12 has various kinds of pre-written system programs (including a system program for controlling data exchange with the machine learning device 100, which will be described later) such as a publicly-known analysis program.

An interface 21 is an interface for connecting the measurement operation parameter adjustment apparatus 1 with the machine learning device 100. The machine learning device 100 includes a processor 101 that entirely controls the machine learning device 100, a ROM 102 that stores system programs and the like, a RAM 103 that performs temporary storage in each processing related to machine learning, and a non-volatile memory 104 that is used for storing learning models and the like. The machine learning device 100 can observe various kinds of information that the measurement operation parameter adjustment apparatus 1 can acquire through the interface 21 (for example, the position of the measurement device 2 in the coordinate system in which the measurement device 2 performs measurement, the position of the sensor of the measurement device 2 at the start of the measurement operation, the travel speed of the sensor of the measurement device 2 during the measurement operation, the amount of time from when a measurement operation has been started to when the sensor has detected an object to be measured during the measurement operation, the product type of the object to be measured, information on the states of the sensor and the object to be measured which have been inputted by an operator, and the like). Upon receiving a measurement operation parameter adjustment command outputted from the machine learning device 100, the measurement operation parameter adjustment apparatus 1 sets measurement operation parameters for the measurement device 2.

FIG. 2 is a functional block diagram schematically illustrating the measurement operation parameter adjustment apparatus 1 and the machine learning device 100 according to one embodiment. Functional blocks illustrated in FIG. 2 are realized when the CPU 11 included in the measurement operation parameter adjustment apparatus 1 and the processor 101 of the machine learning device 100 which are illustrated in FIG. 1 execute respective system programs and respectively control an operation of each section of the measurement operation parameter adjustment apparatus 1 and the machine learning device 100.

The measurement operation parameter adjustment apparatus 1 of the present embodiment includes a measurement operation parameter setting section 34 that controls the measurement device 2 based on a measurement operation parameter adjustment command outputted from the machine learning device 100. The measurement operation parameter setting section 34 is functional means for adjusting measurement operation parameters for use in the measurement operation by the measurement device 2. The measurement operation parameter setting section 34 can set at least measurement operation start position and measurement operation speed for the measurement device 2 measuring the position of an object to be measured.

Meanwhile, the machine learning device 100 provided in the measurement operation parameter adjustment apparatus 1 includes software (such as a learning algorithm) and hardware (such as the processor 101) with which the machine learning device 100 itself learns the adjustment of the measurement operation parameters of the measurement operation with respect to the time taken to perform the measurement operation by so-called machine learning. What the machine learning device 100 provided in the measurement operation parameter adjustment apparatus 1 learns corresponds to a model structure representing the correlation of the adjustment of the measurement operation parameters of the measurement operation with the time taken to perform the measurement operation.

As represented by functional blocks in FIG. 2, the machine learning device 100 provided in the measurement operation parameter adjustment apparatus 1 includes a state observation section 106, a determination data acquisition section 108, and a learning section 110. The state observation section 106 observes measurement operation parameter data S1 representing the measurement operation parameters of the measurement operation and measurement time data S2 representing the time taken to perform the measurement operation as state variables S representing a current environmental state. The determination data acquisition section 108 acquires determination data D that contains measurement operation determination data D1 for determining whether the measurement operation executed based on adjusted measurement operation parameters of the measurement operation is good or bad. The learning section 110 learns the adjustment of the measurement operation parameters of the measurement operation in relation to the time taken to perform the measurement operation using the state variables S and the determination data D.

Of the state variables S observed by the state observation section 106, the measurement operation parameter data S1 can be acquired as the measurement operation parameters of the measurement operation that is performed in the measurement device 2.

Examples of the measurement operation parameters of the measurement operation include the position of the sensor at the start of the measurement operation by the measurement device 2, the travel speed of the sensor during the measurement operation by the measurement device 2, and the like. The measurement operation parameters can be acquired from current parameters set in the measurement device 2, parameters obtained by analyzing a program for operating the measurement device 2, the measurement operation parameters set in the measurement operation parameter adjustment apparatus 1 and stored in a memory such as the non-volatile memory 14 as the measurement operation parameters that have been set in the measurement device 2 in the last learning period, and the like.

As the measurement operation parameter data S1, the measurement operation parameters of the measurement operation which have been adjusted by the machine learning device 100 in the last learning period with respect to the time taken to perform the measurement operation in the last learning period based on a result of learning by the learning section 110 can be used without change. In the case where such an approach is used, the machine learning device 100 may temporarily store the measurement operation parameters of the measurement operation in the RAM 103 in each learning period, and the state observation section 106 may acquire the measurement operation parameters of the measurement operation in the last learning period, which are used as the measurement operation parameter data S1 in the current learning period, from the RAM 103.

Of the state variables S observed by the state observation section 106, the measurement time data S2 can be acquired as the amount of time from when the measurement operation executed by the measurement device 2 has been started to when the sensor has detected an object to be measured, the amount of time being stored in the non-volatile memory 14.

The determination data acquisition section 108 can use, as the measurement operation determination data D1, a result of determination as to whether the measurement operation performed based on adjusted measurement operation parameters of the measurement operation is appropriate or inappropriate. The measurement operation determination data D1 that are used by the determination data acquisition section 108 may be, for example, whether the travel distance of the sensor when the measurement operation has been performed using adjusted measurement operation parameters is smaller (appropriate) or greater (inappropriate) than a predetermined threshold, whether an object to be measured or a working portion or the sensor of the measurement device 2 has been damaged (inappropriate) during the measurement operation, or whether an object to be measured has been moved (inappropriate) during the measurement operation.

It should be noted that the determination data acquisition section 108 is an essential component in a phase in which the learning section 110 is learning, but is not necessarily an essential component after the learning section 110 completes learning the adjustment of the measurement operation parameters of the measurement operation in relation to the time taken to perform the measurement operation. For example, in the case where the machine learning device 100 that has completed learning is shipped to a client, the machine learning device 100 may be shipped after the determination data acquisition section 108 is removed.

From the perspective of learning periods of the learning section 110, the state variables S simultaneously inputted to the learning section 110 are based on data acquired in the last learning period during which the determination data D have been acquired. Thus, during a period in which the machine learning device 100 provided in the measurement operation parameter adjustment apparatus 1 is learning, the following is repeatedly carried out in the environment: the acquisition of the measurement time data S2, the execution of the measurement operation by the measurement device 2 based on the measurement operation parameter data S1 adjusted based on each piece of data acquired, and the acquisition of the determination data D.

The learning section 110 learns the adjustment of the measurement operation parameters of the measurement operation with respect to the time taken to perform the measurement operation in accordance with a freely-selected learning algorithm generically called machine learning. The learning section 110 can repeatedly execute learning based on a data collection containing the state variables S and the determination data D previously described. During the repetition of a learning cycle in which the measurement operation parameters of the measurement operation are learned with respect to the time taken to perform the measurement operation, the state variables S are acquired from the time taken to perform the measurement operation in the last learning period and the measurement operation parameters of the measurement operation which have been adjusted in the last learning period as described previously, and the determination data D are results of determination as to whether the measurement operation performed based on the adjusted measurement operation parameters of the measurement operation is appropriate or inappropriate.

By repeating the above-described learning cycle, the learning section 110 becomes capable of identifying features implying the correlation between the time taken to perform the measurement operation and the adjustment of the measurement operation parameters of the measurement operation. When the learning algorithm is started, the correlation between the time taken to perform the measurement operation and the adjustment of the measurement operation parameters of the measurement operation is substantially unknown. The learning section 110, however, gradually identifies features and interprets the correlation as learning progresses. When the correlation between the time taken to perform the measurement operation and the adjustment of the measurement operation parameters of the measurement operation is interpreted to some reliable level, learning results repeatedly outputted by the learning section 110 become capable of being used to select an action (that is, make a decision) regarding how the measurement operation parameters of the measurement operation should be adjusted with respect to the current state (that is, the time taken to perform the measurement operation). Specifically, as the learning algorithm progresses, the learning section 110 can gradually bring the correlation between the time taken to perform the measurement operation and the adjustment of the measurement operation parameters of the measurement operation, that is, an action regarding how the measurement operation parameters of the measurement operation should be adjusted with respect to the time taken to perform the measurement operation, close to the optimal solution.

A decision-making section 122 adjusts the measurement operation parameters of the measurement operation based on a learning result of the learning section 110 and outputs the adjusted measurement operation parameters of the measurement operation to the measurement operation parameter setting section 34. After the learning by the learning section 110 becomes capable of being used to adjust the measurement operation parameters, when the time taken to perform the measurement operation is inputted to the machine learning device 100, the decision-making section 122 outputs the measurement operation parameters of the measurement operation (for example, at least one of the position of the sensor at the start of the measurement operation and the travel speed of the sensor). The decision-making section 122 appropriately adjusts the measurement operation parameters of the measurement operation based on the state variable S and the learning result of the learning section 110.

As described above, in the machine learning device 100 provided in the measurement operation parameter adjustment apparatus 1, the learning section 110 learns the adjustment of the measurement operation parameters of the measurement operation with respect to the time taken to perform the measurement operation in accordance with a machine learning algorithm using the state variables S observed by the state observation section 106 and the determination data D acquired by the determination data acquisition section 108. The state variables S contain data such as the measurement operation parameter data S1 and the measurement time data S2. The determination data D are unambiguously found from information acquired when the measurement device 2 performs the measurement operation. Accordingly, with the machine learning device 100 provided in the measurement operation parameter adjustment apparatus 1, the measurement operation parameters of the measurement operation can be automatically and accurately adjusted in accordance with the time taken to perform the measurement operation using a learning result of the learning section 110.

Further, if the measurement operation parameters of the measurement operation can be automatically adjusted, the measurement operation parameters of the measurement operation can be quickly adjusted to appropriate values only by obtaining the time (measurement time data S2) taken to perform the measurement operation. Thus, the measurement operation parameters of the measurement operation can be efficiently adjusted.

In one modified example of the machine learning device 100 provided in the measurement operation parameter adjustment apparatus 1, the state observation section 106 may observe, as the state variable S, product type data S3 representing information on the product type of an object to be measured in addition to the measurement operation parameter data S1 and the measurement time data S2. An example of the product type data S3 includes an identification number that is given to an object to be measured such that the type of the object to be measured is uniquely identified. Using the product type data S3 as the state variable S, the position of the sensor at the start of the measurement operation and the travel speed of the sensor can be learned in accordance with the product type of an object to be measured, and a result of the learning can be reflected on the adjustment of the measurement operation parameters.

In another modified example of the machine learning device 100 provided in the measurement operation parameter adjustment apparatus 1, the state observation section 106 may observe, as the state variable S, measurement environment data S4 representing a measurement environment, such as the time of day, the season, the temperature, and the humidity of an environment in which the measurement operation is executed, in addition to the measurement operation parameter data S1 and the measurement time data S2. Some types of objects to be measured (processed food products such as bread and rice cake, fruits, vegetables, and the like) have variation in size or strength that changes depending on temperature, humidity, season, or the like. In a measurement operation in which such an object to be measured is observed, using as the state variable S the measurement environment data S4 observed makes the adjustment of the measurement operation parameters more appropriate.

In the machine learning device 100 having the above-described configuration, the learning algorithm executed by the learning section 110 is not particularly limited, and any learning algorithm publicly-known as machine learning can be employed. FIG. 3 illustrates one aspect of the measurement operation parameter adjustment apparatus 1 illustrated in FIG. 2, which has the configuration including the learning section 110 that executes reinforcement learning as one example of learning algorithm. Reinforcement learning is an approach in which a cycle of observing the current state (that is, input) of an environment where an object to be learned exists, executing a predetermined action (that is, output) in the current state, and giving a certain reward to the action is heuristically repeated, and such a policy (in the machine learning device of the present application, the measurement operation parameters of the measurement operation) that maximizes the total of rewards is learned as an optimal solution.

In the machine learning device 100 provided in the measurement operation parameter adjustment apparatus 1 illustrated in FIG. 3, the learning section 110 includes a reward calculation section 112 and a value function update section 114. The reward calculation section 112 finds a reward R relating to a result (corresponding to the determination data D to be used in a learning period next to the learning period in which the state variable S is acquired) of determination as to whether the measurement operation by the measurement device 2 based on the measurement operation parameters of the measurement operation which have been adjusted based on the state variable S is appropriate or inappropriate. The value function update section 114 updates a function Q representing values of the measurement operation parameters of the measurement operation using the reward R. The learning section 110 learns the adjustment of the measurement operation parameters of the measurement operation with respect to the time taken to perform the measurement operation by the value function update section 114 repeating the update of the function Q.

One example of a reinforcement learning algorithm that the learning section 110 executes will be described. The algorithm according to this example is known as Q-learning and is an approach in which using, as independent variables, the state s of an agent and an action a that the agent can select in the state s, a function Q(s,a) representing the value of the action in the case where the action a is selected in the state s is learned. Selecting such an action a that the value function Q becomes maximum in the state s is the optimal solution. By starting Q-learning in a state in which the correlation between the state s and the action a is unknown and repeating trial and error in which various actions a are selected in arbitrary states s, the value function Q is repeatedly updated to be brought close to the optimal solution. The value function Q can be brought close to the optimal solution in a relatively short time by employing a configuration in which when an environment (that is, the state s) changes as a result of selecting the action a in the state s, a reward r (that is, a weight given to the action a) corresponding to the change can be obtained, and guiding learning so that an action a yielding a higher reward r may be selected.

An update formula for the value function Q is generally represented as the following Formula 1. In Formula 1, $s_t$ and $a_t$ are respectively a state and an action at time t. The action at changes the state to $s_{t+1}$. $r_{t+1}$ is a reward obtained in response to a change of the state from $s_t$ to $s_{t+1}$. The term of maxQ means Q obtained when an action a that provides a maximum value Q (seems at time t to provide a maximum value Q) is taken at time t+1. α and γ are respectively a learning coefficient and a discount rate, and are set as desired in the range of 0<α≤1 and 0<γ≤1.

$$Q(S_t, a_t) \leftarrow Q(S_t, a_t) + \alpha\left(r_{t+1} + \gamma \max_a Q(S_{t+1}, a) - Q(S_t, a_t)\right) \quad \text{[Formula 1]}$$

In the case where the learning section 110 executes Q-learning, the state variable S observed by the state observation section 106 and the determination data D acquired by the determination data acquisition section 108 correspond to the state s in the update formula, an action regarding how the measurement operation parameters of the measurement operation should be adjusted with respect to the current state (that is, the time taken to perform the measurement operation) corresponds to the action a in the update formula, and the reward R found by the reward calculation section 112 corresponds to the reward r in the update formula. Accordingly, the value function update section 114 repeatedly updates the function Q representing values of the measurement operation parameters of the measurement operation with respect to the current state by Q-learning using the reward R.

The reward R found by the reward calculation section 112 may be set as follows: for example, if the measurement operation performed, after the measurement operation parameters of the measurement operation have been adjusted, based on the adjusted measurement operation parameters of the measurement operation is determined to be "appropriate" (for example, the case where the time taken to perform the measurement operation is not more than a predetermined threshold, or the like), the reward R is positive (plus); and if the measurement operation performed, after the measurement operation parameters of the measurement operation have been adjusted, based on the adjusted measurement operation parameters of the measurement operation is determined to be "inappropriate" (for example, the case where the time taken to perform the measurement operation exceeds the predetermined threshold, the case where the sensor collides with an object to be measured, the case where an object to be measured is moved, or the like), the reward R is negative (minus). The absolute values of the positive and negative rewards R may be equal or different. With regard to criteria for determination, a plurality of values contained in the determination data D may be combined to make a determination.

Moreover, results of determination as to whether the measurement operation based on the adjusted measurement operation parameters is appropriate or inappropriate may be classified into a plurality of grades, not only two grades, which are "appropriate" and "inappropriate". For example, in the case where a threshold of the time taken to perform the measurement operation is $T_{max}$ and where T is the time taken to perform the measurement operation, rewards may be set as follows: reward R=5 is given when $0 \leq T < T_{max}/5$, reward R=3 is given when $T_{max}/5 \leq T < T_{max}/2$, reward R=1 is given when $T_{max}/2 \leq T < T_{max}$, and reward R=−3 (minus reward) is given when $T_{max} \leq T$.

Further, a threshold for use in determination may be set relatively large in the initial phase of learning, and may decrease as learning progresses.

The value function update section 114 may have an action-value table in which the state variables S, the determination data D, and the reward R are organized in relation to action values (for example, numerical values) represented by the function Q. In this case, the action that the value function update section 114 updates the function Q is synonymous with the action that the value function update section 114 updates the action-value table. When Q-learning is started, the correlation between the current state of the environment and the adjustment of the measurement operation parameters of the measurement operation is unknown. Accordingly, in the action-value table, various state variables S, the determination data D, and the reward R are prepared in a form associated with randomly determined values (function Q) of the action value. It should be noted that if the determination data D is known, the reward calculation section 112 can immediately calculate a reward R corresponding to the determination data D, and the calculated value R is written to the action-value table.

As Q-learning is advanced using the reward R corresponding to the appropriate/inappropriate determination result for the measurement operation of the measurement device 2, learning is guided in the direction in which an action yielding a higher reward R is selected, and the value (function Q) of the action value of an action that is taken in the current state is rewritten in accordance with the state (that is, the state variable S and the determination data D) of the environment that changes as the result of execution of the selected action in the current state, thus updating the action-value table. By repeating this update, the values (function Q) of action values displayed in the action-value table are rewritten so as to increase with increasing appropriateness of actions (in the present invention, appropriate actions are actions to adjust the measurement operation parameters of the measurement operation, such as bringing the position of the sensor at the start of the measurement operation closer to an object to be measured or increasing the travel speed of the sensor without breaking the object to be measured, the working portion of the measurement device 2, or the sensor or moving the object to be measured). This gradually reveals the correlation, which has been unknown, between the current environmental state (time taken to perform the measurement operation) and an action (adjustment of the measurement operation parameters of the measurement operation) with respect to the current environmental state. In other words, by updating the action-value table, the relationship between the time taken to perform the measurement operation and the adjustment of the measurement operation parameters of the measurement operation is gradually brought close to the optimal solution.

Referring to FIG. 4, the flow (that is, one aspect of the machine learning method) of the above-described Q-learning that the learning section 110 executes will be further described. First, in step SA01, the value function update section 114 randomly selects an action to adjust the measurement operation parameters of the measurement operation as an action that is taken in the current state represented by the state variable S observed by the state observation section 106, with reference to the action-value table at that time. Next, in step SA02, the value function update section 114 takes in the state variable S of the current state that the state observation section 106 is observing. Then, in step SA03, the value function update section 114 takes in the determination data D of the current state that the determination data acquisition section 108 has acquired. Next, in step SA04, the value function update section 114 determines, based on the determination data D, whether the measurement operation based on the adjusted measurement operation parameters of the measurement operation has been appropriate. If it has been determined that the measurement operation has been appropriate, the value function update section 114, in step SA05, applies a positive reward R found by the reward calculation section 112 to the update formula for the function Q, and then, in step SA06, updates the action-value table using the state variable S and the determination data D in the current state, the reward R, and the value (function Q after update) of the action value. If it has been determined in step SA04 that the measurement operation based on the adjusted measurement operation parameters of the measurement operation has not been appropriate, the value function update section 114, in step SA07, applies a negative reward R found by the reward calculation section 112 to the update formula for the function Q, and then, in step SA06, updates the action-value table using the state variable S and the determination data D in the current state, the reward R, and the value (function Q after update) of the action value. The learning section 110 repeatedly updates the action-value table by repeating steps SA01 to SA07, thus advancing the learning of the adjustment of the measurement operation parameters of the measurement operation. It should be noted that the process for finding the reward R and updating the value function from step SA04 to step SA07 is executed for each piece of data contained in the determination data D.

Figure 5A:
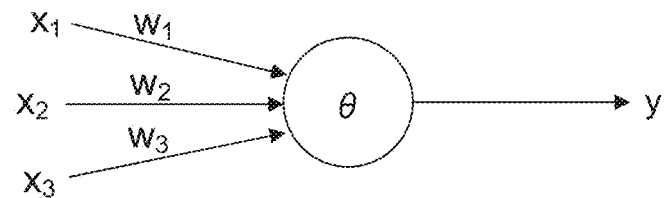
FIG. 5A is a diagram for explaining a neuron.
Figure 5B:
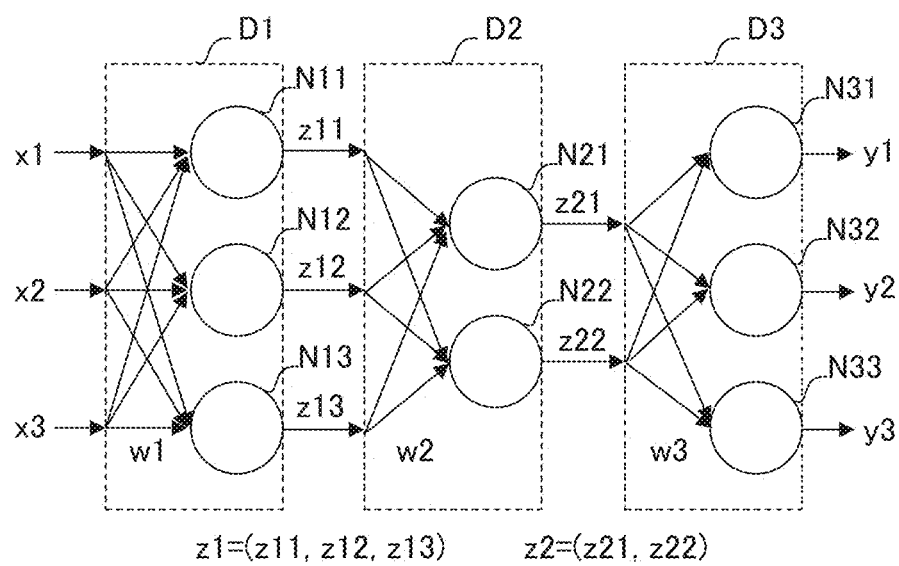
FIG. 5B is a diagram for explaining a neural network.

To advance the aforementioned reinforcement learning, for example, a neural network can be applied. FIG. 5A schematically illustrates a model of a neuron. FIG. 5B schematically illustrates a model of a three-layered neural network which is configured by combining the neurons illustrated in FIG. 5A. The neural network can be composed of arithmetic devices, storage devices, or the like, for example, in imitation of the model of neurons.

The neuron illustrated in FIG. 5A outputs a result y with respect to a plurality of inputs x (input $x_1$ to input $x_3$ as an example here). Inputs $x_1$ to $x_3$ are respectively multiplied by weights w ($w_1$ to $w_3$) corresponding to these inputs x. Accordingly, the neuron outputs the output y expressed by Formula 2 below. Here, in Formula 2, all of input x, output y, and weight w are vectors. Further, θ denotes a bias and $f_k$ denotes an activation function.

$$y = f_k(\Sigma_{i=1}^{n} x_i w_i - \theta) \qquad \text{Formula 2}$$

In the three-layered neural network illustrated in FIG. 5B, a plurality of inputs x (input x1 to input x3 as an example here) are inputted from the left side and results y (result y1 to result y3 as an example here) are outputted from the right side. In the example illustrated in FIG. 5B, inputs x1, x2, x3 are each multiplied by corresponding weights (collectively denoted by W1) and each of inputs x1, x2, x3 is inputted into three neurons N11, N12, N13.

In FIG. 5B, an output of each of the neurons N11, N12, N13 is collectively denoted by z1. z1 can be considered as a feature vector obtained by extracting a feature amount of an input vector. In the example illustrated in FIG. 5B, feature vectors z1 are each multiplied by corresponding weights (collectively denoted by W2) and each of feature vectors z1 is inputted into two neurons N21, N22. Feature vector z1 represents a feature between weight W1 and weight W2.

In FIG. 5B, an output of each of the neurons N21, N22 is collectively denoted by z2. z2 can be considered as a feature vector obtained by extracting a feature amount of feature vector z1. In the example illustrated in FIG. 5B, feature vectors z2 are each multiplied by corresponding weights (collectively denoted by W3) and each of feature vectors z2 is inputted into three neurons N31, N32, N33. Feature vector z2 represents a feature between weight W2 and weight W3. Finally, neurons N31 to N33 respectively output results y1 to y3.

Here, the method of so-called deep learning in which a neural network having three or more layers is used may be employed as well.

In the machine learning device 100 provided in the measurement operation parameter adjustment apparatus 1, the learning section 110 can use a neural network as a value function in Q-learning to perform multi-layer calculation following the above-described neural network using the state variable S and the action a as the input x, thus outputting the value (result y) of the action in the state. It should be noted that operation modes of the neural network include a learning mode and a value prediction mode. For example, weights w are learned using a learning data set in the learning mode, and the value of an action can be determined using the learned weights w in the value prediction mode. It should be noted that in the value prediction mode, detection, classification, inference, and the like can also be performed.

The above-described configuration of the measurement operation parameter adjustment apparatus 1 can be described as a machine learning method (or software) that the processor 101 executes. This machine learning method is a machine learning method for learning the adjustment of the measurement operation parameters of the measurement operation. The machine learning method includes: a step of observing the measurement operation parameter data S1 and the measurement time data S2 as the state variables S representing the current state of the environment in which the measurement device 2 operates; a step of acquiring the determination data D representing a result of determination as to whether the measurement operation based on the adjusted measurement operation parameters of the measurement operation is appropriate; and a step of learning the adjustment of the measurement operation parameters of the measurement operation in relation to the measurement time data S2 using the state variable S and the determination data D. In this method, the steps are performed by a CPU of a computer.

Figure 6:
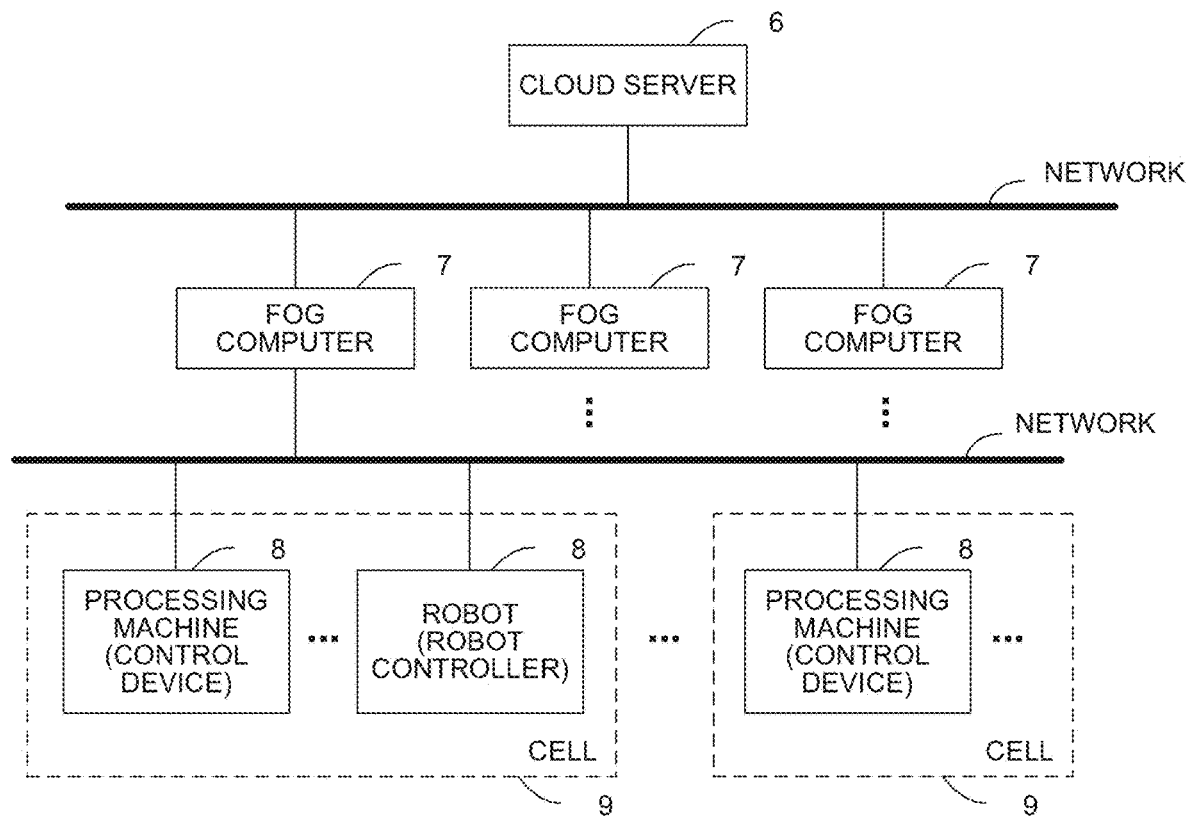
FIG. 6 is a diagram illustrating an example of a system having a three-layer structure which includes a cloud server, fog computers, and edge computers.

In the following second to fourth embodiments, embodiments are described in which the measurement operation parameter adjustment apparatus 1 according to the first embodiment is connected to a plurality of apparatuses including a cloud server, a host computer, a fog computer, and an edge computer (such as a robot controller or a control device) through a wired/wireless network. As illustrated in FIG. 6, systems assumed in the following second to fourth embodiments include a plurality of apparatuses, each of the apparatuses being connected to a network and logically placed into one of the following three layers: a layer including a cloud server 6 and the like, a layer including fog computers 7 and the like, and a layer including edge computers 8 (such as a robot controller or a control device included in a cell 9) and the like. In such a system, the measurement operation parameter adjustment apparatus 1 can be implemented on any of a cloud server 6, a fog computer 7, and an edge computer 8. The plurality of apparatuses can share learning data through a network to perform distributed learning. Generated learning models can be collected in the fog computer 7 or the cloud server 6 to perform large-scale analysis. Mutual reuse or the like of generated learning models can also be performed. In the system illustrated in FIG. 6, a plurality of cells 9 are provided in each of factories in various locations, and the cells 9 are managed at a predetermined level (such as a factory level, or a level including a plurality of factories of the same manufacturer) by fog computers 7 in a higher layer. Data collected and analyzed by the fog computers 7 further are collected, analyzed, and the like by the cloud server 6 in a further higher layer, and information thus obtained can be used in the control and the like of each edge computer.

Figure 7:
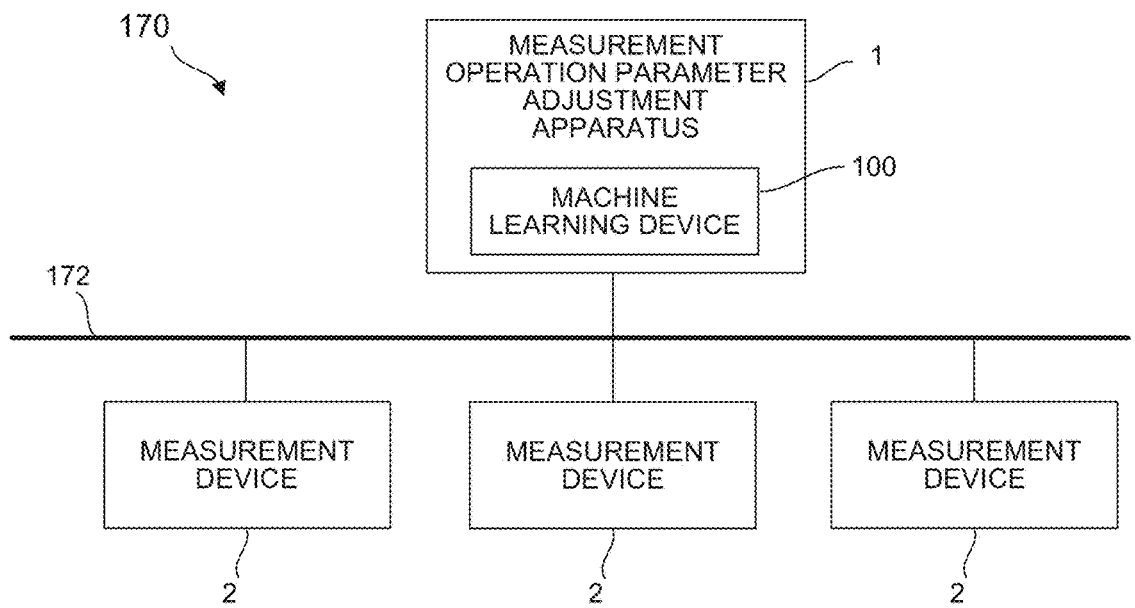
FIG. 7 is a functional block diagram schematically illustrating one aspect of a system including the measurement operation parameter adjustment apparatus.

FIG. 7 illustrates a system 170 according to a second embodiment, which includes the measurement operation parameter adjustment apparatus 1. The system 170 includes at least one measurement operation parameter adjustment apparatus 1 implemented as part of a computer, such as an edge computer, a fog computer, a host computer, or a cloud server, a plurality of measurement devices 2 for which the measurement operation parameters are adjusted, and a wired/wireless network 172 that connects the measurement operation parameter adjustment apparatus 1 and the measurement devices 2.

In the system 170 having the above-described configuration, the measurement operation parameter adjustment apparatus 1 including the machine learning device 100 can automatically and accurately find the adjustment of the measurement operation parameters of the measurement operation with respect to the time taken to perform the measurement operation for each of the measurement devices 2, using a result of learning by the learning section 110. The system 170 may be configured so that the machine learning device 100 of the measurement operation parameter adjustment apparatus 1 can learn the adjustment of the measurement operation parameters of the measurement operation common to all the measurement devices 2 based on the state variable S and the determination data D, which are obtained for each of the measurement devices 2 and that a result of the learning can be shared among all the measurement devices 2 during the operation thereof. With the system 170, the speed and reliability of learning of the adjustment of the measurement operation parameters of the measurement operation can be improved using more various data collections (including the state variable S and the determination data D) as inputs.

Figure 8:
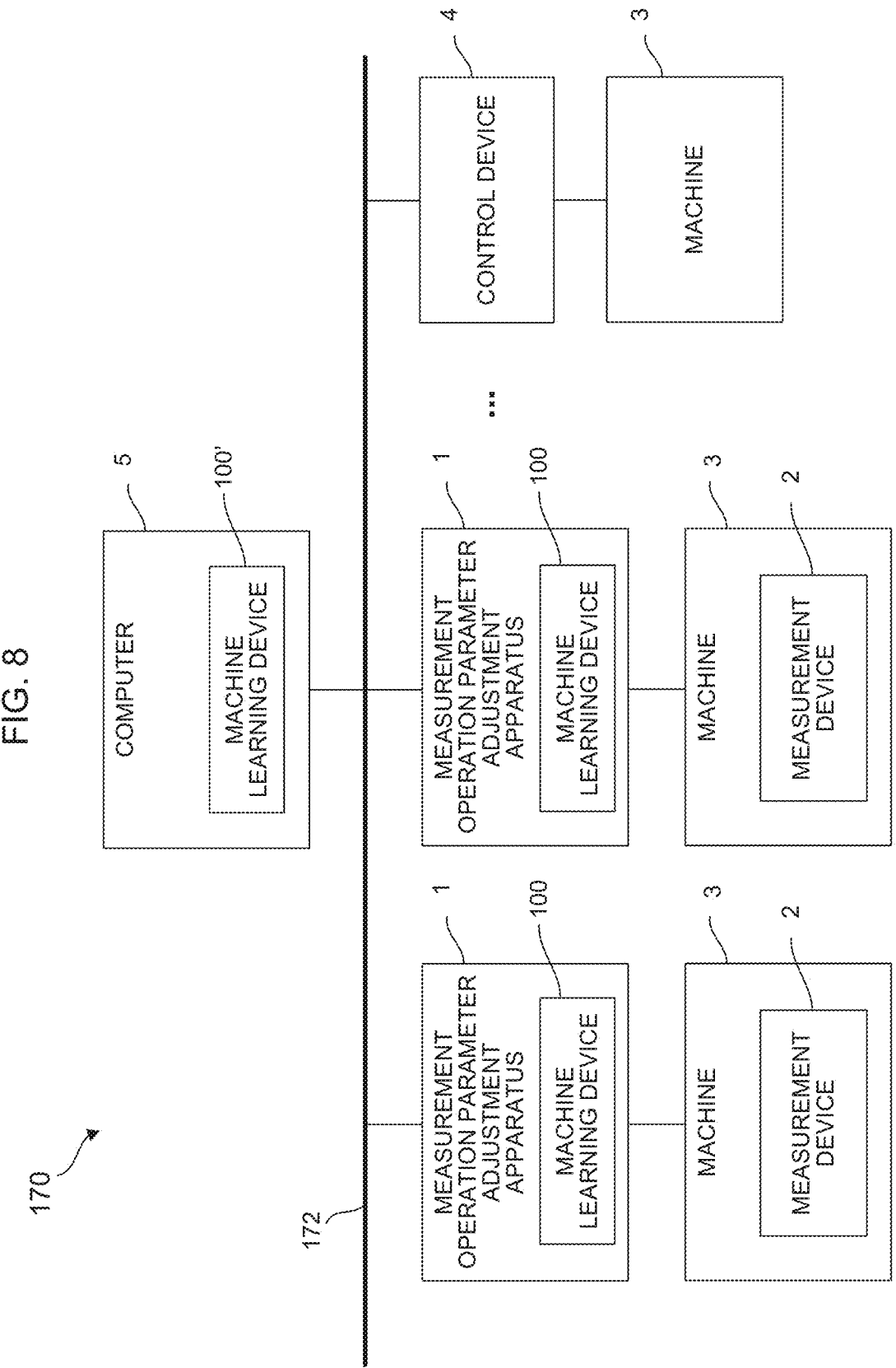
FIG. 8 is a functional block diagram schematically illustrating another aspect of the system including the measurement operation parameter adjustment apparatus.

FIG. 8 illustrates a system 170 according to a third embodiment, which includes the measurement operation parameter adjustment apparatus 1. The system 170 includes at least one machine learning device 100' implemented on a computer 5, such as a cell computer, a fog computer, a host computer, or a cloud server, at least one measurement operation parameter adjustment apparatus 1 implemented as a control device (edge computer) for controlling a machine 3 on which the measurement device 2 is disposed, and a wired/wireless network 172 that connects the computer(s) 5 and the measurement operation parameter adjustment apparatus(es) 1.

In the system 170 having the above-described configuration, the computer 5 including the machine learning device 100' acquires, from the measurement operation parameter adjustment apparatus 1 (control device) for controlling each machine 3, a learning model obtained as a result of machine learning by the machine learning device 100 provided in the measurement operation parameter adjustment apparatus 1. The machine learning device 100' provided in the computer 5 performs knowledge optimization and streamlining processing based on the learning models to newly generate an optimized or streamlined learning model, and deploys the generated learning model to the measurement operation parameter adjustment apparatus 1 for controlling each machine 3 (measurement device 2).

One example of the optimization or streamlining of a learning model which is performed by the machine learning device 100' is to generate a distilled model based on a plurality of learning models acquired from the measurement operation parameter adjustment apparatuses 1. In this case, the machine learning device 100' according to the present embodiment creates input data that are inputted to the learning models, and performs learning from scratch using outputs obtained by inputting the input data to the learning models, thus newly generating a learning model (distilled model). The distilled model thus generated is more suitable for deployment to other apparatuses through external storage media, networks, and the like, such as described above.

Another example of the optimization or streamlining of a learning model which is performed by the machine learning device 100' is to, in the process of distilling the plurality of learning models acquired from the respective measurement operation parameter adjustment apparatuses 1, analyze the distribution of outputs of each learning model with respect to input data using a general statistical approach, extract outliers from combinations of input data and output data, and perform distillation using combinations of input data and output data except the outliers. With such a process, exceptional estimation results can be eliminated from combinations of input data and output data obtained from the respective learning models, and a distilled model can be generated using combinations of input data and output data obtained by eliminating the exceptional estimation results. Thus, from learning models generated by the plurality of measurement operation parameter adjustment apparatuses 1, a distilled model can be generated, the distilled model being generally used for the machines 3 (measurement devices 2) controlled by the measurement operation parameter adjustment apparatuses 1.

It should be noted that other general approach for the optimization or streamlining of a learning model (for example, analyzing the learning models and optimizing hyperparameters of the learning models based on results of the analysis) can be appropriately introduced.

In one example of the system according to the present embodiment, the machine learning device 100' may be disposed on the computer 5 as a fog computer provided to manage a plurality of measurement operation parameter adjustment apparatuses 1 as edge computers, and learning models generated by the respective measurement operation parameter adjustment apparatuses 1 may be aggregated and stored on the fog computer. After optimization or streamlining is performed based on the stored learning models, an optimized or streamlined learning model can be re-deployed to the measurement operation parameter adjustment apparatuses 1 as needed.

In another example of the system according to the present embodiment, learning models aggregated and stored on the computer 5 as a fog computer and learning models optimized or streamlined on the fog computer may be collected on a host computer or a cloud server in a higher layer. These learning models can be applied to intellectual tasks (constructing and re-deploying a more general learning model on an higher-level server, supporting maintenance work of the measurement devices 2 based on a result of analysis of the learning models, analyzing performance and the like of each measurement device 2, applying the learning models to the development of a new machine, and the like) in factories or a maker of the measurement devices 2.

Figure 9:
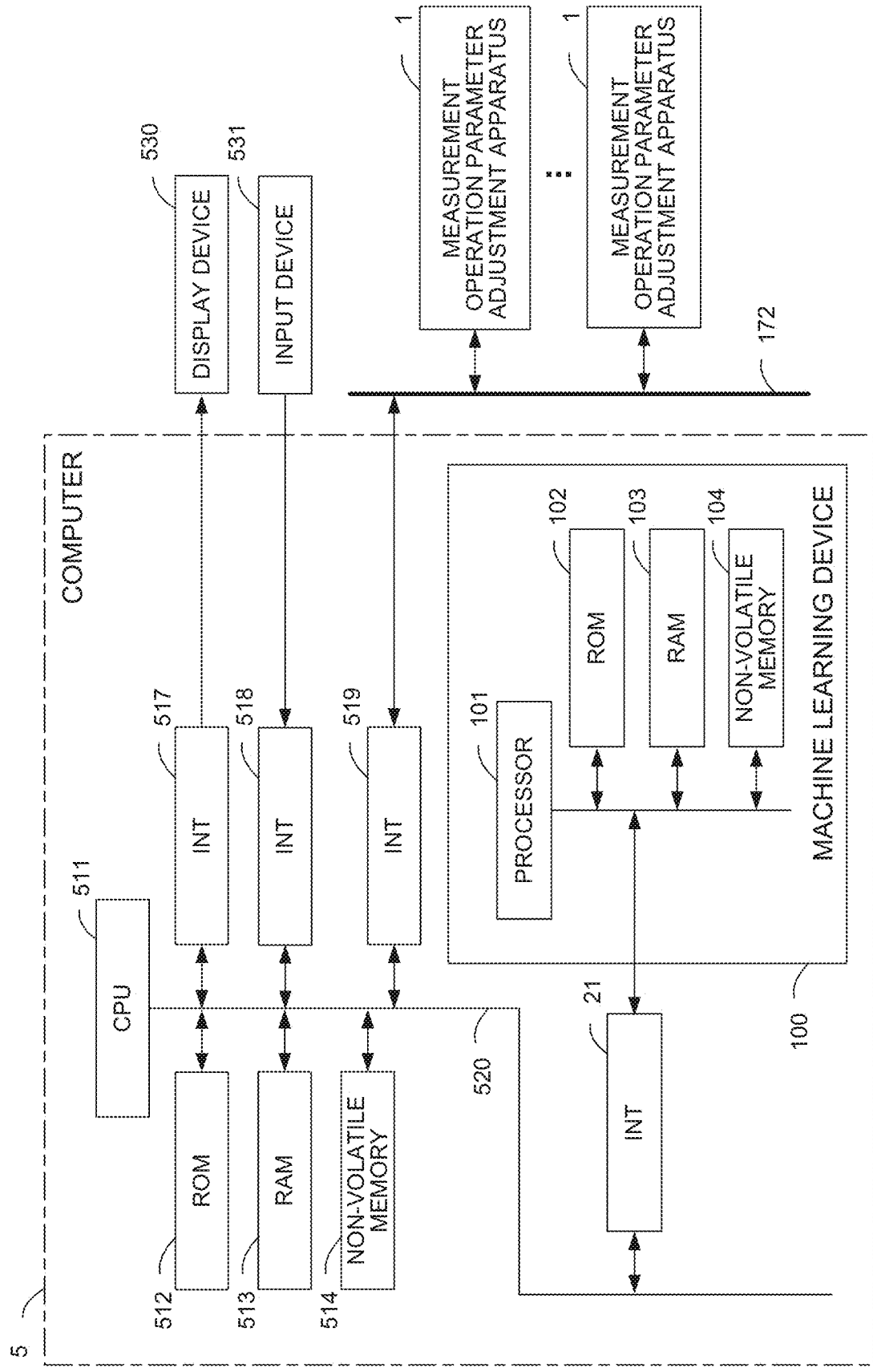
FIG. 9 is a hardware configuration diagram schematically illustrating a computer illustrated in FIG. 8.

FIG. 9 is a hardware configuration diagram schematically illustrating the computer 5 illustrated in FIG. 8.

A CPU 511 provided in the computer 5 is a processor that wholly controls the computer 5. The CPU 511 retrieves a system program stored in a ROM 512 through a bus 520, and controls the entire computer 5 in accordance with the system program. A RAM 513 temporarily stores temporary calculation data, various kinds of data inputted by an operator through an input device 531, and the like.

A non-volatile memory 514 is configured as a memory that uses, for example, an unillustrated battery for memory backup, a solid state drive (SSD), or the like to maintain the state of memory even when the power of the computer 5 is shut off. The non-volatile memory 514 stores setting areas storing setting information regarding the operation of the computer 5, data inputted from the input device 531, learning models acquired from the measurement operation parameter adjustment apparatuses 1, data read through an unillustrated external storage device or a network, and the like. Such programs and various kinds of data stored in the non-volatile memory 514 may be loaded into the RAM 513 at the time of execution or use. The ROM 512 has system programs prewritten therein, such as a publicly-known analysis program for analyzing various kinds of data.

The computer 5 is connected to the network 172 through an interface 516. At least one measurement operation parameter adjustment apparatus 1, other computer, and the like are connected to the network 172 to send and receive data to/from the computer 5.

A display device 530 receives data such as various kinds of data loaded into a memory and data obtained as a result of execution of a program or the like through an interface 517 and displays such data. The input device 531 including a keyboard, a pointing device, and the like passes a command, data, or the like, based on operation by an operator, to the CPU 511 through an interface 518.

It should be noted that the machine learning device 100 has the same hardware configuration as that in FIG. 1, except for being used for the optimization or streamlining of a learning model in cooperation with the CPU 511 of the computer 5.

Figure 10:
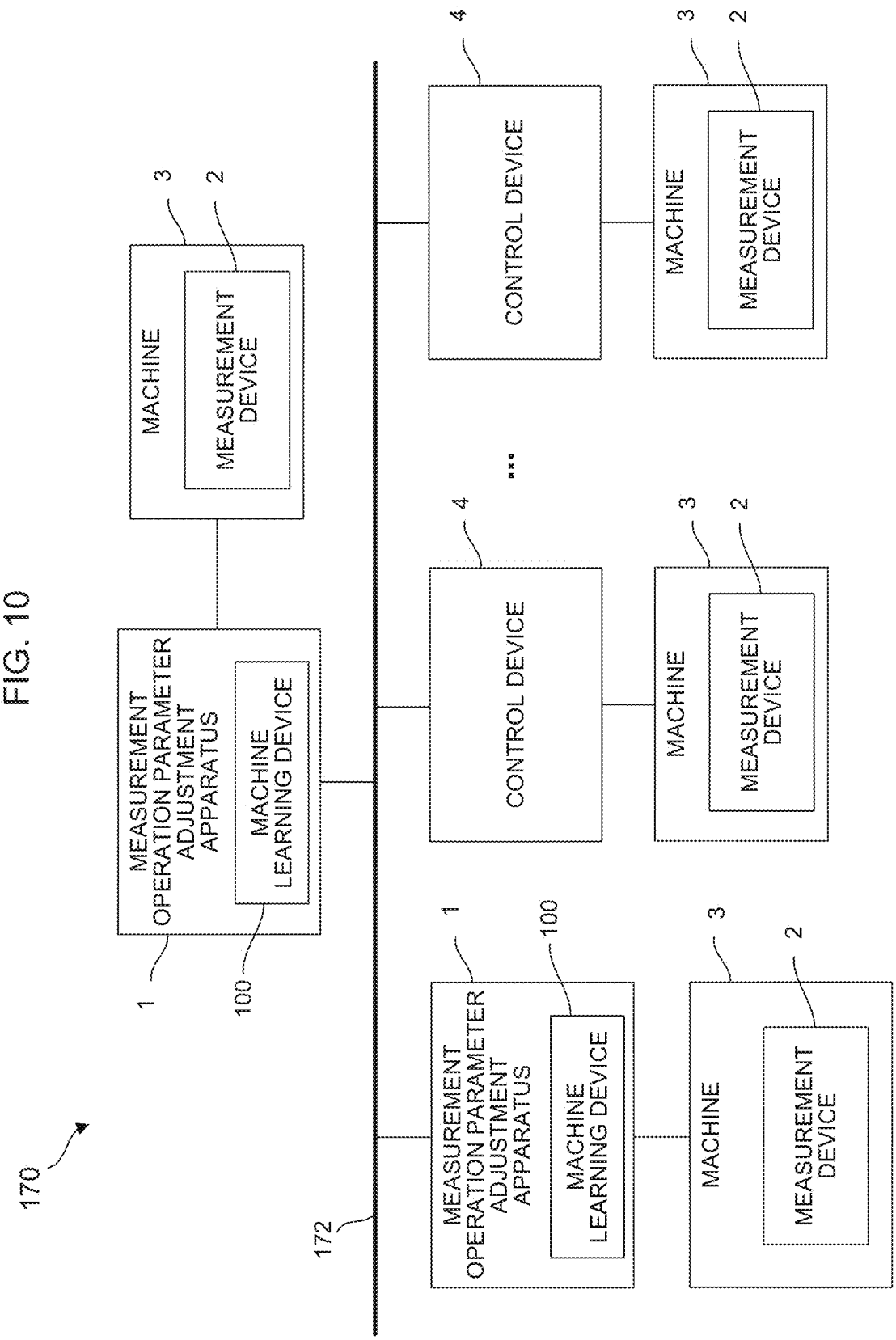
FIG. 10 is a functional block diagram schematically illustrating still another aspect of the system including the measurement operation parameter adjustment apparatus.

FIG. 10 illustrates a system 170 according to a fourth embodiment, which includes the measurement operation parameter adjustment apparatus 1. The system 170 includes at least one measurement operation parameter adjustment apparatus 1 implemented as a control device (edge computer) for controlling a machine 3 on which a measurement device 2 is disposed, a plurality of control devices 4 for controlling machines 3 on which other measurement devices 2 are disposed, and a wired/wireless network 172 for connecting the measurement operation parameter adjustment apparatus(es) 1 and the control devices 4.

In the system 170 having the above-described configuration, the measurement operation parameter adjustment apparatus 1 including the machine learning device 100 performs machine learning based on state data and determination data acquired from the machine 3 (measurement device 2) controlled by the measurement operation parameter adjustment apparatus 1 and state data and determination data acquired from the other control devices 4 (without the machine learning device 100), and generates a learning model. The learning model thus generated is used to adjust the measurement operation parameters of the measurement operation of the machine (measurement device 2) controlled by the measurement operation parameter adjustment apparatus 1 itself, and also used to adjust the measurement operation parameters in the other machines 3 (measurement devices 2) in response to requests from the control devices 4 that control the other machines 3 (measurement devices 2) having no machine learning device 100. When a measurement operation parameter adjustment apparatus 1 including a machine learning device 100 that has not generated a learning model yet is newly introduced, the newly introduced measurement operation parameter adjustment apparatus 1 can also use a learning model acquired through the network 172 from other measurement operation parameter adjustment apparatus 1 having the learning model.

In the system according to the present embodiment, data for use in learning and learning models can be shared and used among a plurality of measurement operation parameter adjustment apparatuses 1 and control devices 4 as so-called edge computers. Accordingly, the efficiency of machine learning can be improved, and the cost of machine learning can be reduced (for example, introducing the machine learning device 100 to only one control device (measurement operation parameter adjustment apparatus 1) and sharing the machine learning device 100 among other control devices 4).

The embodiments of the present invention have been described above, but the present invention can be embodied in various aspects by adding arbitrary alterations, without being limited only to the examples of the above-described embodiments.

For example, the learning algorithm and the arithmetic algorithm that the machine learning device 100 executes, the control algorithm that the measurement operation parameter adjustment apparatus 1 executes, and the like are not limited to the above-described ones, and various algorithms can be employed.

The above-described embodiments include the description that the measurement operation parameter adjustment apparatus 1 and the machine learning device 100 are devices including CPUs different from each other, but the machine learning device 100 may be realized by the CPU 11 included in the measurement operation parameter adjustment apparatus 1 and the system program stored in the ROM 12.

The embodiments of the present invention have been described above, but the present invention can be embodied in other aspects by adding arbitrary alterations, without being limited to the examples of the above-described embodiments.

The invention claimed is:

1. A measurement operation parameter adjustment apparatus, comprising:
    a machine learning device including a processor configured to
        observe (i) measurement operation parameter data representing a measurement operation parameter of a measurement operation that is executed by a measurement device for measuring a placement position of an object to be measured, and (ii) measurement time data representing time taken to perform the measurement operation as a state variable representing a current environmental state,
        perform learning or decision-making using a learning model obtained by modeling adjustment of the measurement operation parameter based on the state variable, and
        control the measurement device based on the learning model by outputting a measurement operation parameter adjustment command to adjust the measurement operation parameter of the measurement operation that is executed by the measurement device.

2. The measurement operation parameter adjustment apparatus according to claim 1, wherein
    the processor is further configured to
        acquire measurement operation determination data for determining whether the measurement operation executed based on the measurement operation parameter of the measurement operation is appropriate, as determination data representing an appropriate/inappropriate determination result for the measurement operation, and
        generate the learning model obtained by learning the adjustment of the measurement operation parameter of the measurement operation in relation to the time taken to perform the measurement operation using the state variable and the determination data.

3. The measurement operation parameter adjustment apparatus according to claim 2, wherein
    the processor is further configured to
        observe product type data representing product type information on the object to be measured as the state variable representing the current environmental state, and
        learn the adjustment of the measurement operation parameter of the measurement operation in relation to the time taken to perform the measurement operation and the product type information on the object to be measured.

4. The measurement operation parameter adjustment apparatus according to claim 2, wherein
    the processor is further configured to
        find a reward relating to the appropriate/inappropriate determination result,
        using the reward, update a function representing a value of an action to adjust the measurement operation parameter of the measurement operation with respect to the time taken to perform the measurement operation, and
        provide higher rewards in response to the time taken to perform the measurement operation being shorter and lower rewards in response to the time taken to perform the measurement operation being longer, the object to be measured or the measurement device being damaged, or the object to be measured being moved.

5. The measurement operation parameter adjustment apparatus according to claim 1, wherein the processor is configured to perform the learning by multi-layer calculation of the state variable and the determination data.

6. The measurement operation parameter adjustment apparatus according to claim 1, wherein
the processor is configured to:
obtain the learning model by learning the adjustment of the measurement operation parameter of the measurement operation in relation to the time taken to perform the measurement operation, and
determine the adjustment of the measurement operation parameter of the measurement operation based on the state variable and the learning model.

7. The measurement operation parameter adjustment apparatus according to claim 1, wherein the machine learning device is located on a cloud server.

8. A machine learning device, comprising:
a processor configured to
observe (i) measurement operation parameter data representing a measurement operation parameter of a measurement operation that is executed by a measurement device for measuring a placement position of an object to be measured, and (ii) measurement time data representing time taken to perform the measurement operation as a state variable representing a current environmental state,
perform learning or decision-making using a learning model obtained by modeling adjustment of the measurement operation parameter based on the state variable, and
control the measurement device based on the learning model by outputting a measurement operation parameter adjustment command to adjust the measurement operation parameter of the measurement operation that is executed by the measurement device.

9. The machine learning device according to claim 8, wherein
the processor is further configured to
acquire measurement operation determination data for determining whether the measurement operation executed based on the measurement operation parameter of the measurement operation is appropriate, as determination data representing an appropriate/inappropriate determination result for the measurement operation; and
generate the learning model obtained by learning the adjustment of the measurement operation parameter of the measurement operation in relation to the time taken to perform the measurement operation using the state variable and the determination data.

10. The machine learning device according to claim 8, wherein the processor is further configured to:
obtain the learning model by learning the adjustment of the measurement operation parameter of the measurement operation in relation to the time taken to perform the measurement operation, and
determine the adjustment of the measurement operation parameter of the measurement operation based on the state variable and the learning model.

11. A system, comprising:
a plurality of apparatuses connected to each other through a network, wherein
the plurality of apparatuses include at least a first measurement operation parameter adjustment apparatus according to claim 2.

12. The system according to claim 11, wherein
the plurality of apparatuses include a computer including a further machine learning device,
the computer is configured to acquire at least one learning model generated by learning in the first measurement operation parameter adjustment apparatus, and
the further machine learning device in the computer is configured to perform optimization or streamlining based on the acquired at least one learning model.

13. The system according to claim 11, wherein
the plurality of apparatuses include a second measurement operation parameter adjustment apparatus different from the first measurement operation parameter adjustment apparatus, and
the first measurement operation parameter adjustment apparatus is configured to share the learning model with the second measurement operation parameter adjustment apparatus.

14. The system according to claim 11, wherein
the plurality of apparatuses include a controller configured to control the measurement device, and
the first measurement operation parameter adjustment apparatus is configured to learn data regarding the measurement device, the data being acquired in the controller through the network.

15. A method, comprising:
observing (i) measurement operation parameter data representing a measurement operation parameter of a measurement operation that is executed by a measurement device for measuring a placement position of an object to be measured, and (ii) measurement time data representing time taken to perform the measurement operation as a state variable representing a current environmental state,
performing learning or decision-making using a learning model obtained by modeling adjustment of the measurement operation parameter based on the state variable, and
controlling the measurement device based on the learning model by outputting a measurement operation parameter adjustment command to adjust the measurement operation parameter of the measurement operation that is executed by the measurement device.

16. A method, comprising:
performing a process regarding machine learning of adjustment of a measurement operation parameter using a learning model obtained by modeling the adjustment of the measurement operation parameter based on (i) measurement operation parameter data representing the measurement operation parameter of a measurement operation that is executed by a measurement device for measuring a placement position of an object to be measured, and (ii) measurement time data representing time taken to perform the measurement operation, the measurement operation parameter data and the measurement time data being observed as a state variable representing a current environmental state, and
controlling the measurement device based on the learning model by outputting a measurement operation parameter adjustment command to adjust the measurement operation parameter of the measurement operation that is executed by the measurement device.

17. The method according to claim 16, wherein
the performing the process includes
observing the measurement operation parameter data representing the measurement operation parameter of the measurement operation and the measurement time data representing the time taken to perform the measurement operation as the state variable representing the current environmental state, acquiring measurement operation determination data for determining whether the measurement operation executed based on the measurement operation parameter of the measurement operation is appropriate, as determination data representing an appropriate/inappropriate determination result for the measurement operation, and learning the adjustment of the measurement operation parameter of the measurement operation in relation to the time taken to perform the measurement operation using the state variable and the determination data.

18. The method according to claim 16, wherein the performing the process includes observing the measurement operation parameter data representing the measurement operation parameter of the measurement operation and the measurement time data representing the time taken to perform the measurement operation as the state variable representing the current environmental state, and determining the adjustment of the measurement operation parameter of the measurement operation based on the observed state variable and a result of learning the adjustment of the measurement operation parameter of the measurement operation in relation to the time taken to perform the measurement operation.

19. The measurement operation parameter adjustment apparatus according to claim 1, wherein the measurement operation parameter includes a position of a sensor of the measurement device at a start of the measurement operation by the measurement device, and a travel speed of the sensor during the measurement operation by the measurement device.

20. The measurement operation parameter adjustment apparatus according to claim 1, wherein the measurement time data include an amount of time from when the measurement operation executed by the measurement device is started to when a sensor of the measurement device detects the object to be measured.

* * * * *